(12) United States Patent
Waldon

(10) Patent No.: US 11,820,381 B2
(45) Date of Patent: Nov. 21, 2023

(54) ELECTRIC CONCRETE TRANSPORTATION CART

(71) Applicant: Allen Engineering Corporation, Paragould, AR (US)

(72) Inventor: Edward Andrew Waldon, Paragould, AR (US)

(73) Assignee: Allen Engineering Corp., Paragould, AR (US)

( * ) Notice: Subject to any disclaimer, the term of this patent is extended or adjusted under 35 U.S.C. 154(b) by 461 days.

(21) Appl. No.: 17/152,218

(22) Filed: Jan. 19, 2021

(65) Prior Publication Data
US 2021/0229664 A1    Jul. 29, 2021

Related U.S. Application Data

(60) Provisional application No. 62/965,001, filed on Jan. 23, 2020.

(51) Int. Cl.
| | |
|---|---|
| *B60W 30/188* | (2012.01) |
| *B60P 1/04* | (2006.01) |
| *B62D 1/16* | (2006.01) |
| *B60K 23/00* | (2006.01) |
| *B60K 1/00* | (2006.01) |

(52) U.S. Cl.
CPC ............ *B60W 30/188* (2013.01); *B60K 1/00* (2013.01); *B60K 23/00* (2013.01); *B60P 1/04* (2013.01); *B62D 1/16* (2013.01); *B60W 2422/50* (2013.01); *B60Y 2400/61* (2013.01)

(58) Field of Classification Search
CPC ... B60W 30/188; B60W 2422/50; B60K 1/00; B60K 23/00; B60P 1/04; B62D 1/16; B60Y 2400/61
See application file for complete search history.

(56) References Cited

U.S. PATENT DOCUMENTS

| | | | | |
|---|---|---|---|---|
| 4,771,846 | A | * | 9/1988 | Venable .................. B62D 5/09 188/164 |
| 5,333,795 | A | * | 8/1994 | Jessen .................... A01C 15/02 239/685 |

(Continued)

OTHER PUBLICATIONS

Power Buggy Electric Buggy, https://www.forconstructionpros.com/concrete/equipment-products/buggies-conveyors-misc-placing/product/12281741/indy-equipment-indy-equipment-elect.

(Continued)

*Primary Examiner* — Jacob D Knutson
(74) *Attorney, Agent, or Firm* — Stephen D. Carver

(57) ABSTRACT

An electrically powered, self-propelled cart for safely delivering heavy loads, such as concrete, within job sites with unlevel, irregular, or sloped terrain. A cargo bucket is tiltable over front drive wheels for transporting and dumping cargo. Electric drive motors associated with a transaxle propel wheels at a selectable speed in response to an electric control module. A steering column rotates in response to manually operated handle bars and activates a sensor to generate signals delivered to the control module for throttle adjustments. The sensor may be a linear potentiometer, a rotary differential transformer or a rotary encoder or shaft encoder measuring angular displacement. Extreme steering displacements will electrically reduce cart speed notwithstanding the previous speed setting chosen by the operator through the steering column.

2 Claims, 16 Drawing Sheets

(56) References Cited

U.S. PATENT DOCUMENTS

| | | | |
|---|---|---|---|
| 6,170,584 B1 | 1/2001 | Mistry et al. | |
| 6,336,600 B1* | 1/2002 | Jessen | A01C 7/06 |
| | | | 239/650 |
| 6,491,122 B2 | 12/2002 | Leitner et al. | |
| 7,108,096 B1 | 9/2006 | Oxley | |
| 7,954,573 B2* | 6/2011 | Jessen | B62D 11/006 |
| | | | 180/6.32 |
| 9,205,752 B1 | 12/2015 | Bentz | |
| 9,623,903 B2* | 4/2017 | Cook | B62D 1/12 |
| 9,771,967 B2 | 9/2017 | Papke | B05B 12/002 |
| 10,308,278 B2 | 6/2019 | Tsubaki | |
| 10,384,704 B2* | 8/2019 | Fielder | B62D 51/005 |
| 10,486,726 B1 | 11/2019 | Logan | |
| 2001/0027895 A1* | 10/2001 | Murata | B62D 1/166 |
| | | | 180/446 |
| 2004/0158375 A1 | 8/2004 | Tsutsumi et al. | |
| 2005/0178607 A1* | 8/2005 | Kodama | B62D 5/065 |
| | | | 180/422 |
| 2006/0260859 A1 | 11/2006 | Kasten et al. | |
| 2009/0138168 A1 | 5/2009 | Labuhn et al. | |
| 2012/0012409 A1 | 1/2012 | Turner | |
| 2012/0136539 A1* | 5/2012 | Bryant | B60K 28/16 |
| | | | 701/42 |
| 2015/0191201 A1 | 7/2015 | Schaedler | |

OTHER PUBLICATIONS

Quick ride on Power buggy, https://www.forconstructionpros.com/concrete/equipment-products/buggies-conveyors-misc-placing/product/12281741/indy-equipment-indy-equipment-elec.

Allen AT14, At14F,AR12L, AT16, At14S track drive power buggies: https://alleneng.com/concrete-equipment/placing/concrete-buggy/track-drive-power-buggy.

Allen wheeled power buggies: https://alleneng.com/concrete-equipment/placing/concrete-buggy.

Chikusui Canycom walk-behind carrriers: http://www.canycom.jp/eng/products/series/crawler.html.

Chikusui Canycom track carrriers and buggies: http://www.canycom.jp/eng/products/series/doboku.html.

Chikusui Canycom wheel type carrriers: http://www.canycom.jp/eng/products/series/hoyle.html.

\* cited by examiner

ELECTRIC CONCRETE TRANSPORTATION CART

CROSS REFERENCE TO RELATED APPLICATION

This utility conversion patent application is based upon, and claims priority from prior U.S. Provisional Application Ser. No. 62/965,001, filed Jan. 23, 2020, by inventor Edward Andrew Waldon (an American Citizen), residing at 4006 West Kingshighway, Paragould, Arkansas (AR) 72450, which was entitled "Electric Concrete Transportation Cart."

BACKGROUND OF THE INVENTION

1. Field of the Invention

This invention relates generally to electrically powered, wheeled buggies or carts and to steering and speed control systems associated therewith. More particularly, the present invention relates to self-propelled, electrically powered carts, wagons and other hauling or moving devices, particularly those used at construction sites, that exhibit a tendency to lose control and possible tip over when traveling too fast.

2. Description of the Prior Art

Many relatively small vehicles and carts are used to transport moderate to heavy loads between work stations in typical or construction environments. In the concrete industry and trades, for example, small carts or wagons are often employed to move multiple, batches of concrete mix from a concrete delivery truck to the construction area. This type of cart or wagon is needed because large and heavy concrete mixer trucks cannot access the work site in many job locations, because of restricted access and narrow or obstructed pathways. Thus several small batches of concrete must be transported by carts or wagons to the construction site.

However, the ground around most construction sites is irregular and unlevel. Access passageways are often riddled with potholes, puddles and debris or other obstacles. Typical job sites can be strewn with rocks, sticks, piles of leaves and the like. Often the trail leading to the pour site may be sloped and otherwise haphazardly defined. Relatively small, self propelled carts or wagons have the appropriate dimensional clearance, but they can be tipped over when traversing irregular ground, especially when driven too fast. The danger is aggravated by the fact that the irregular pathways leading to the pour site require substantial steering efforts, and too much deflection of the steered wheels can aggravate the propensity for tipping. Even on flat concrete surfaces stability can be a problem. When carts are loaded irregularly with heavy loads, imbalance may cause tilting and even tipping over. Moreover, shifting loads that occur suddenly can destabilize older conventional carts and buggies. It is also recognized in the art that with older buggies, centrifugal forces experienced at higher speeds in tight turns can cause rollovers. Furthermore, centrifugal forces developed with older conventional buggies from higher speeds in tight turns can cause the operator to lose balance and/or be thrown from the operators platform.

Accordingly, there is a need in the construction arts for an improved concrete delivery vehicle characterized by a reduced propensity to tip over. Stated another way, there is a need for a reliable and simple batch delivery system that automatically slows the cart or wagon during extreme turns to maintain stability.

Prior art speed control devices that sense steering angles or deflection are known in the art.

For example, U.S. Pat. No. 6,491,122 issued Dec. 10, 2002 shows an electronic speed control for vehicles. A propulsion system is switchable between two modes, one of which allows a higher maximum speed than the other. A steering angle sensor and a tilt switch prevent the user from selecting the high-speed mode while steering sharply or while going down or across steep slopes.

U.S. Pat. No. 6,170,584 issued Jan. 9, 2001 illustrates a speed control system for a tracked vehicle having an engine-driven hydraulic steering pump which drives a hydraulic steering motor. The steering pump is responsive to an operator manipulated steering wheel. The steering motor provides an input to a differential track drive mechanism which responds to manipulation of the steering wheel and drives left and right tracks to turn the vehicle. A control unit calculates a motor speed threshold value as a function of sensed engine speed and steering control signals, and generates a fault signal as a function of a relationship between the steering motor speed signal and a motor speed threshold value. The fault signal may be processed to safely limit speed.

U. S. Pat. No. Application No. 20040158375 published Aug. 12, 2004 discloses a motion control apparatus for automotive vehicles that limits speed by monitoring the vehicle steering angle.

U. S. Pat. No. Application No. 20060260859 published Nov. 23, 2006 discloses a drive speed control system for vehicles with rear wheel drive and steerable front wheels. A control unit insures that a front/rear wheel speed ratio is a linear trigonometric function of a sensed steering angle signal. Speed is thus relative to the sensed steering angle.

U. S. Pat. No. Application No. 20090138168 published May 28, 2009 discloses a method for operating a cruise control system that identifies certain low speed environments, like parking lots, where usage of the cruise control system is usually inappropriate. The method compares a sensed steering wheel position to a steering wheel threshold to determine if the vehicle is operating in an inappropriate, low speed environment and, if so, disables the cruise control system accordingly.

U. S. Pat. No. Application No. 20120136539 published May 31, 2012 illustrates an electronically controlled, speed limiting system for turf maintenance machines. In this device a hydraulic pump operating a traction motor has its output varied by an actuator that is connected to a controller. The controller monitors a wheel speed sensor. A brake is activated by the controller if the wheel speed sensor detects wheel slipping or spinning. A steering position sensor signal is used by the controller to modify brake activation during machine turns.

U.S. Pat. No. 7,108,096 issued Sep. 19, 2006 discloses a control system for use with a self-propelled, steerable vehicle, such as a lawn mower or the like. Speed is limited by feedback derived by interconnection with the steering system. The system slows vehicle speed when turns are made beyond a predetermined range and the speed equals or exceeds a predetermined level, as determined by a speed control device connected to a speed control linkage. This slowing results in increased traction during tight turns, and it also improves dynamic stability.

A non-electrically powered solution for safely moving batches of concrete about a job site is disclosed in U.S. Pat.

No. 10,384,704 entitled "Steering Responsive Speed-controlled Buggy" by inventor Fielder, issued Aug. 20, 2019, which is owned by the same assignee as in this case. This cart prevents tipping and excessive speeds in response to mechanical signals derived from the steering apparatus that control the throttle. The buggy has a cargo bucket that is tiltable over front drive wheels for transporting and dumping green concrete. Hydraulic drive motors driven by a hydraulic pump propel the drive wheels at a user-selected speed. Handlebars rotate a steering column for steering. A throttle cable extending from the handlebars controls the throttle setting by pivoting a throttle lever mounted on the hydraulic pump. Limiting linkages extend from flanges on an anchor bracket secured to the steering column to a bridge on the throttle lever. As the steering column rotates, the limit linkages are wound partially about it, pivoting the throttle lever by pulling on the bridge, reducing speed. Heavy steering displacements will retract the throttle lever to reduce cart speed notwithstanding the previous speed setting chosen by the operator via the cable.

However, the cart of U.S. Pat. No. 10,384,704 is propelled by a traditional internal combustion motor, and exhaust fumes are vented locally. An electric version would avoid polluting cramped, indoor environments. At the same time, an electric version must be capable of automatic speed limiting to prevent tipping and excessive speed in response to severe or excessive steering displacements.

Thus there exists a demand for a speed control device for an electrically-powered cart or buggy that senses steering displacements and directly limits vehicle speed in proportion thereto.

SUMMARY OF THE INVENTION

An electrically powered, self-propelled, steerable batch cart for delivering loads of materials or supplies, such as raw concrete mix, at a desired job site. The cart comprises a rigid chassis supported by an electrically powered transaxle that turns a pair of drive wheels. Steering is accomplished by a pair of rear steering wheels. A cargo bucket pivotally mounted over the chassis front wheels can be hydraulically displaced between a rest or load position and a tilted, load discharge position. Machine control is effectuated by an electrical control module.

A steering system preferably comprising handle bars accessible from an operator position can be grasped and turned for steering the rear wheel assembly to aim the cart. Speed inputs to the control module are established by a hand-grip-controlled input. As a steering column shaft is displaced, electric signals are generated by an electric sensor, preferably a linear potentiometer, to generate a speed control signal. When predetermined steering limits are sensed, the electric speed control signals delivered to the control module automatically reduce speed to prevent tipping or loss of control.

Thus a basic object of the invention is to provide an electrically powered buggy or cart that is stable and safe when heavily loaded and subjected to extreme or excessive steering.

Another fundamental object is to provide an electric concrete batch delivery cart or buggy that is stable and safe.

Another basic object is to automatically limit speed in an electrically powered buggy or cart in to avoid unsafe conditions.

Another object is to provide an electric cart with the above characteristics that limits speed in response to predetermined steering displacements.

A related object is to provide an electric buggy or cart of the character described that remains stable during sharp turns, even when heavily loaded.

Another object is to provide such an electrically powered cart that can safely maneuver over rough and irregular terrain that is characteristic of typical construction sites.

It is also an object to provide an electric buggy or cart for construction use wherein over-speed conditions that might result in tilting or rolling are inherently resisted, if not completely eliminated.

Another basic object is to provide a self propelled, electric cart that resists overspeed conditions when sharply turning over sloped and irregular terrain.

Yet another object is to provide a self-propelled electric buggy or cart of the character described that can safely traverse sloped, irregular pathways strewn with debris and obstacles.

It is also a goal to provide an electrically powered, batch load cart that can produce maximum torque at zero motor RPM.

A further object is to produce a cart of the character described with minimal pollution and reduced emissions.

These and other objects and advantages will appear or become apparent in the course of the following descriptive sections.

BRIEF DESCRIPTION OF THE DRAWINGS

In the accompanying drawings, which form a part of the specification and which are to be construed in conjunction therewith, and wherein like reference numerals have been employed where reasonably possible to indicate like parts in the various views.

DETAILED DESCRIPTION OF THE PREFERRED EMBODIMENTS

Figure 1:
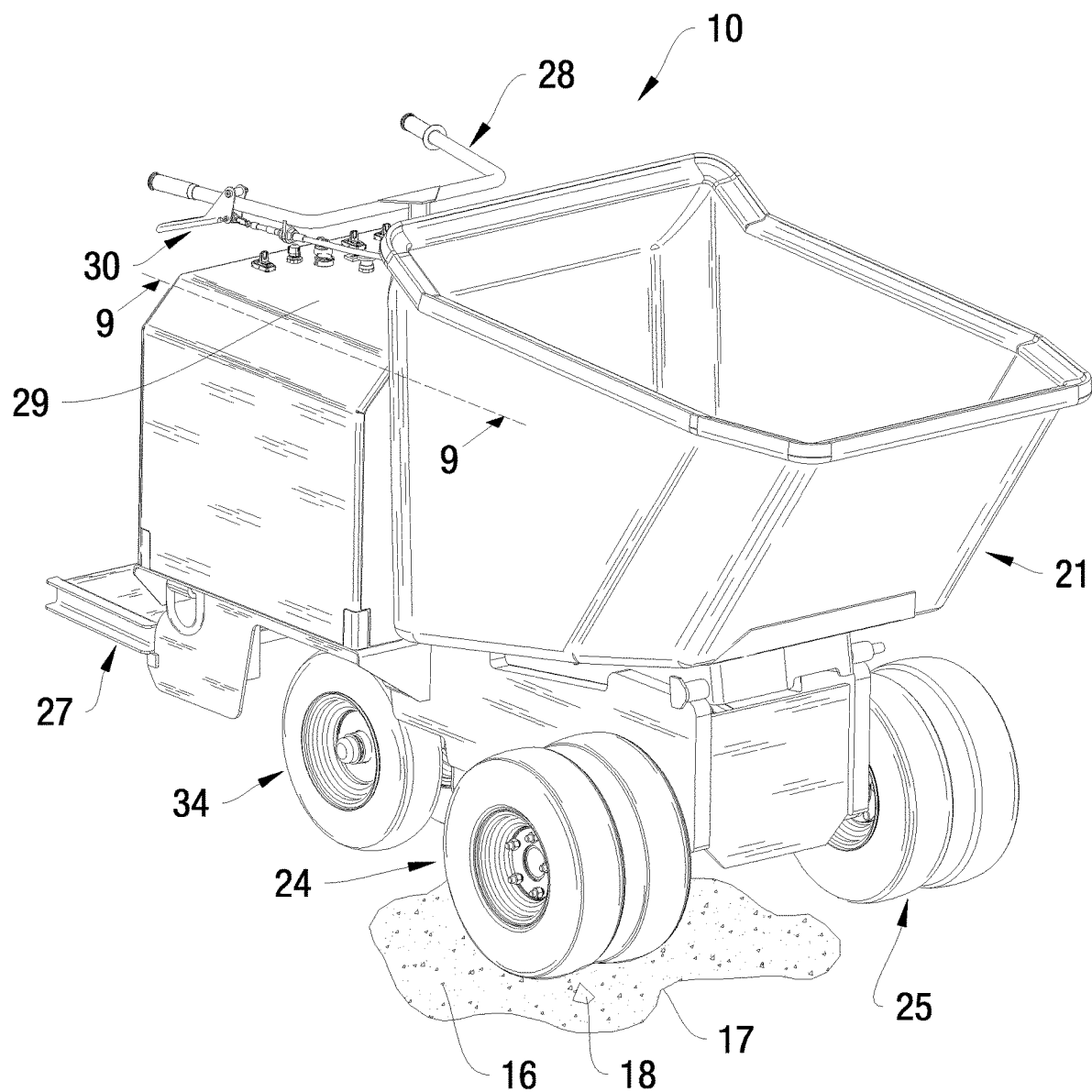
FIG. 1 is a frontal isometric view of my new Electric Concrete Transportation Cart constructed in accordance with the best mode of the invention, showing it deployed in a construction zone over rough terrain and upon an irregular, sloped pathway that is partially obstructed by debris.
Figure 2:
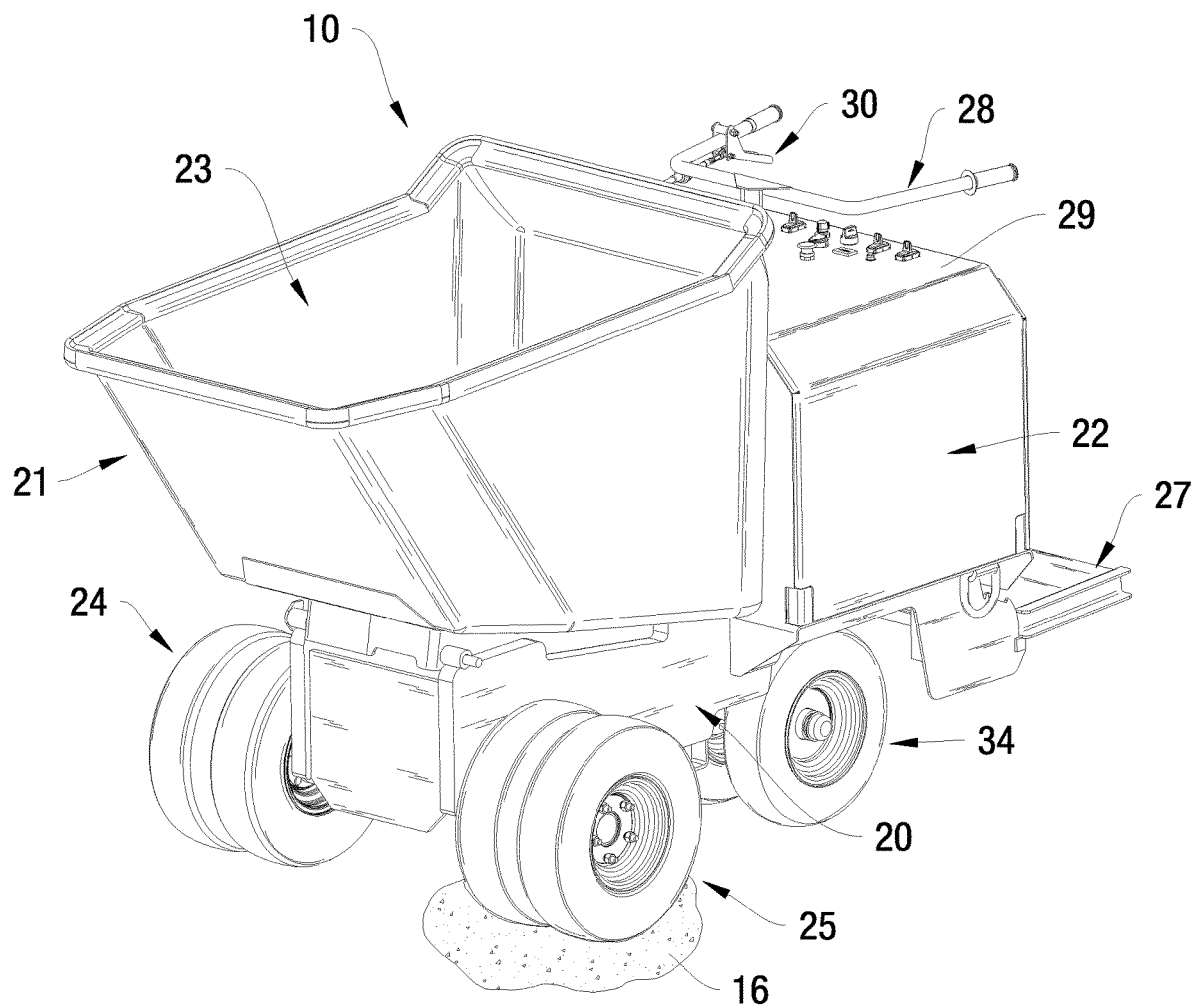
FIG. 2 is a left, frontal isometric view thereof.

With initial reference now directed to FIGS. 1-6 of the appended drawings, an electrically powered, self-propelled, cart or buggy constructed in accordance with the best mode of the invention has been generally designated by the reference numeral 10. (For purposes of the disclosure the terms "cart" and/or "buggy" are used interchangeably.) The cart 10 includes many chassis and frame similarities to prior U.S. Pat. No. 10,384,704 entitled "Steering Responsive Speed-controlled Buggy" issued Aug. 20, 2019 which, for purposes of disclosure, is incorporated by reference as if fully set forth herein.

Cart 10 is adapted to be deployed within a construction zone or work site for moving materials or supplies or tools to work site positions over an available pathway over ground 16. The cart 10 is especially adapted for hauling small batches (i.e., up to 2500 pounds) of green concrete to areas that cannot be safely or conveniently reached by much larger and heavier concrete mixing trucks. As appreciated from FIG. 1, ground 16 is unlevel, and travel pathways in the direction of point 17 over ground 16 may be sloped and rough. There is debris 18 scattered about. Therefore the cart 10 must be stable when heavily loaded, and it must safely accommodate irregular and unlevel pathways while moving heavy loads. To this effect it has been determined that unfortunate accidents involving tipping or rolling over are often caused, at least in part, by excessive speed. Further, speed is a particularly destabilizing factor when steering at extreme angles, particularly over rough or sloped terrain.

Figure 3:
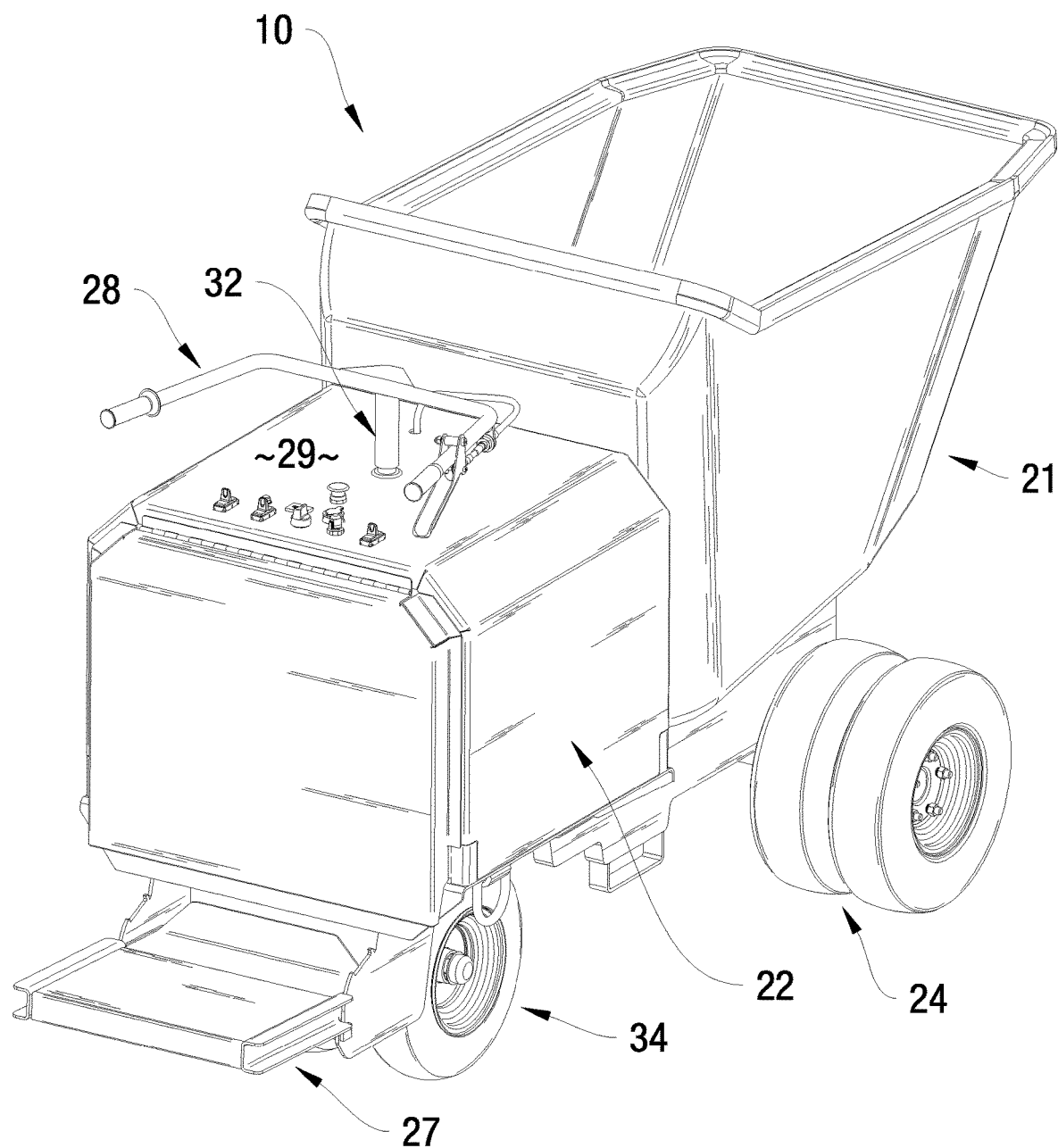
FIG. 3 is a right, rear isometric view thereof.
Figure 4:
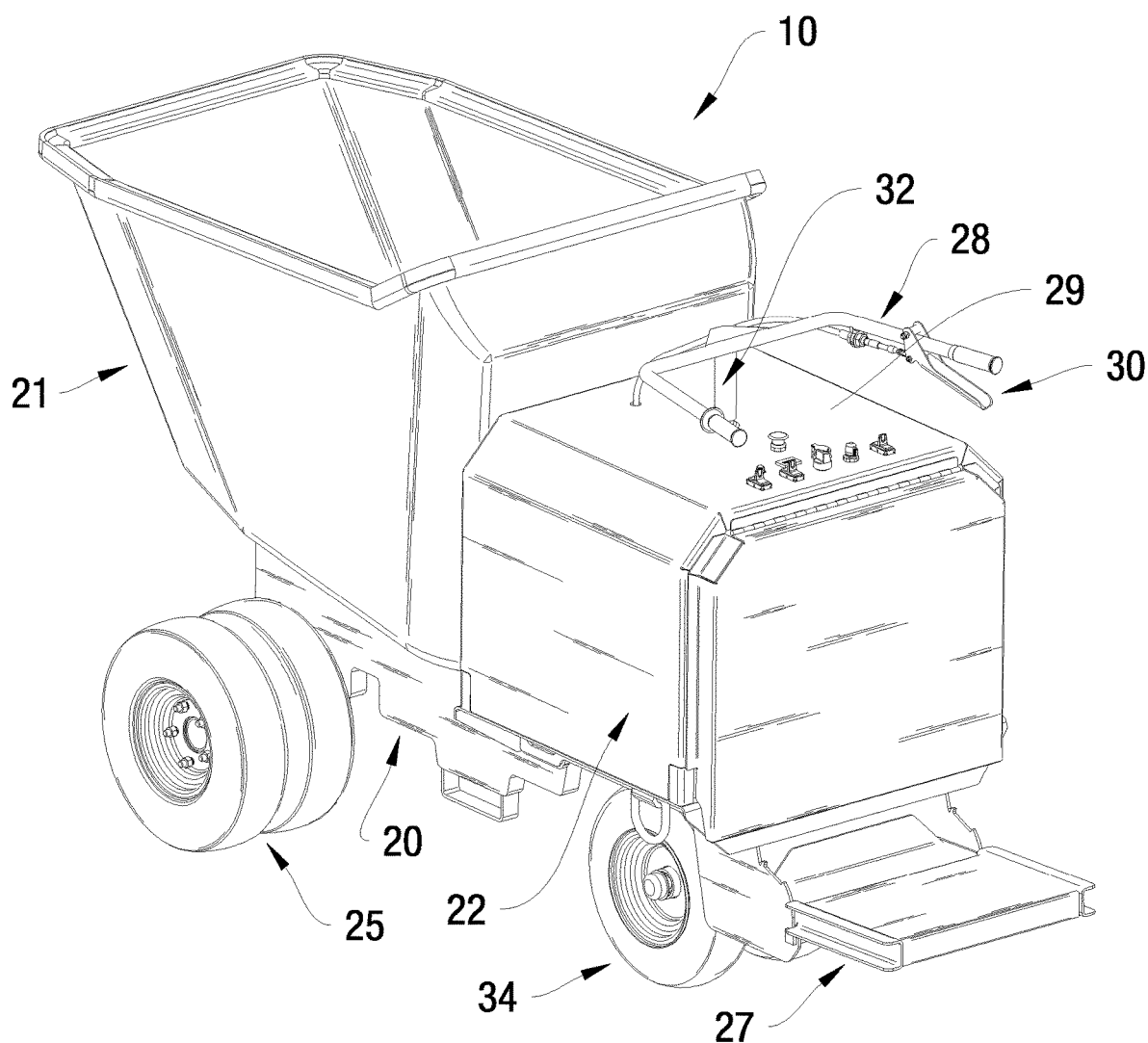
FIG. 4 is a left, rear isometric view thereof.
Figure 4A:
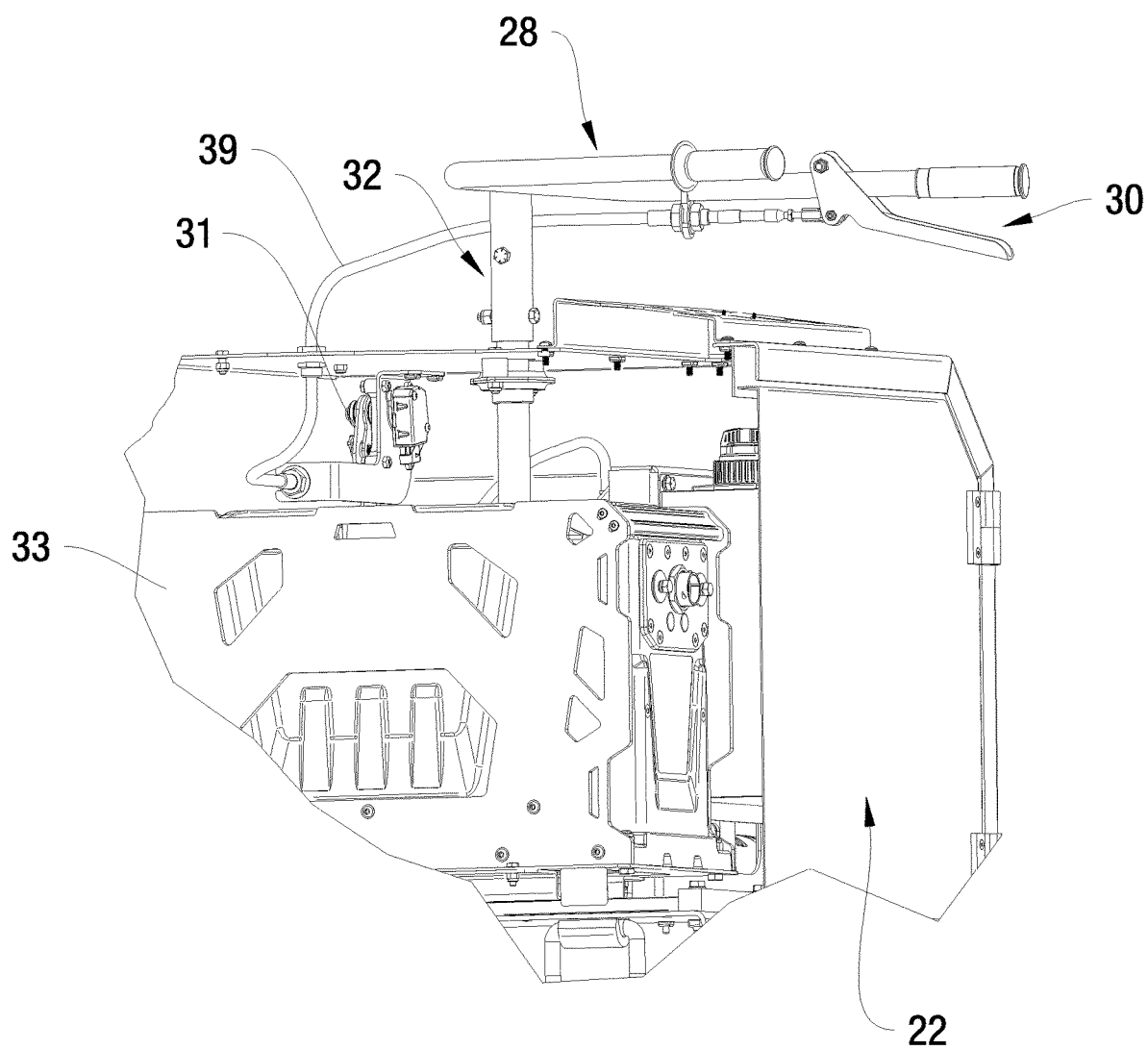
FIG. 4A is a fragmentary isometric view based on FIG. 4, with parts thereof broken away or shown in section for clarity.
Figure 5:
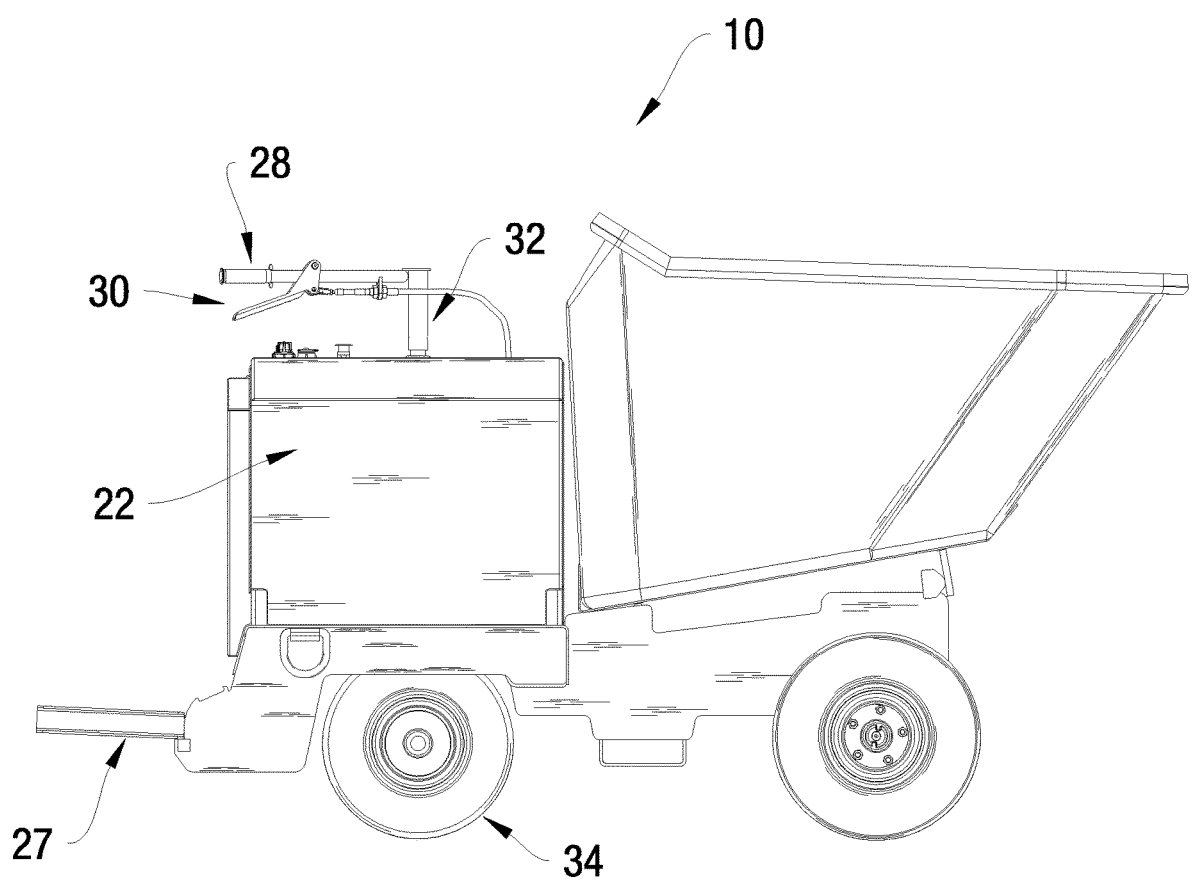
FIG. 5 is a right side elevational view thereof.
Figure 12:
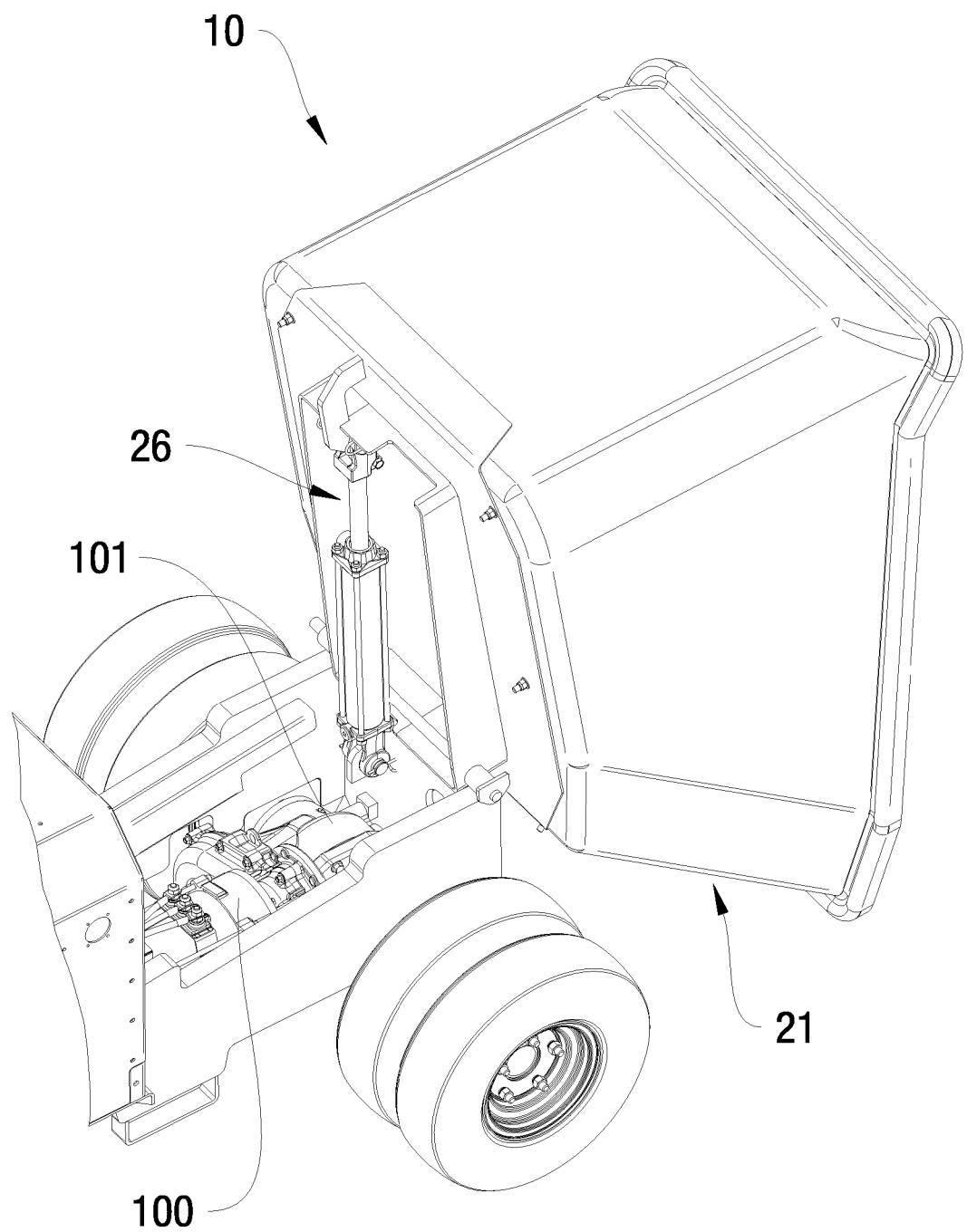
FIG. 12 is a fragmentary isometric view of the cart showing the cargo box in a tilted position.

Cart 10 comprises a rigid chassis 20 supporting an enclosure 22 in which parts described below are housed. Chassis 20 supports a cargo bucket 21 that is tiltable over the front drive wheel pairs 24 and 25 for conveniently dumping cargo transported within bucket interior 23. Drive wheel pairs 24 (FIG. 3), 25 (FIG. 2) are driven by a transaxle assembly described below. A hydraulic cylinder 26 (i.e., FIG. 12) controls the bucket 21. Normally bucket 21 is disposed in a horizontal rest position seen in FIGS. 1-3, for example, for transport or loading, but the bucket can be hydraulically tilted for material discharge as seen in FIG. 12. Power is supplied by a Vanguard five-kilowatt battery pack 33 (FIG. 4A).

Figure 6:
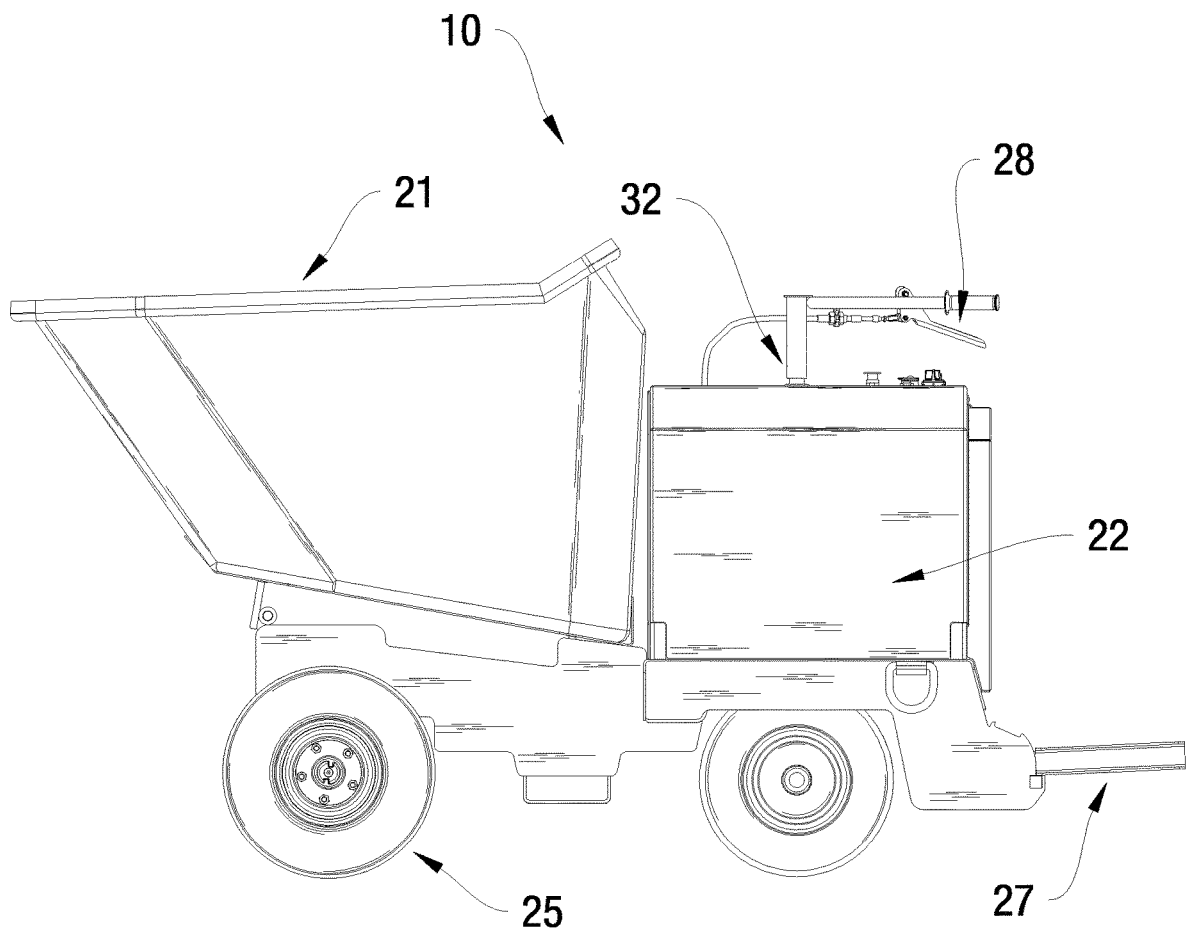
FIG. 6 is a left side elevational view thereof.
Figure 6A:
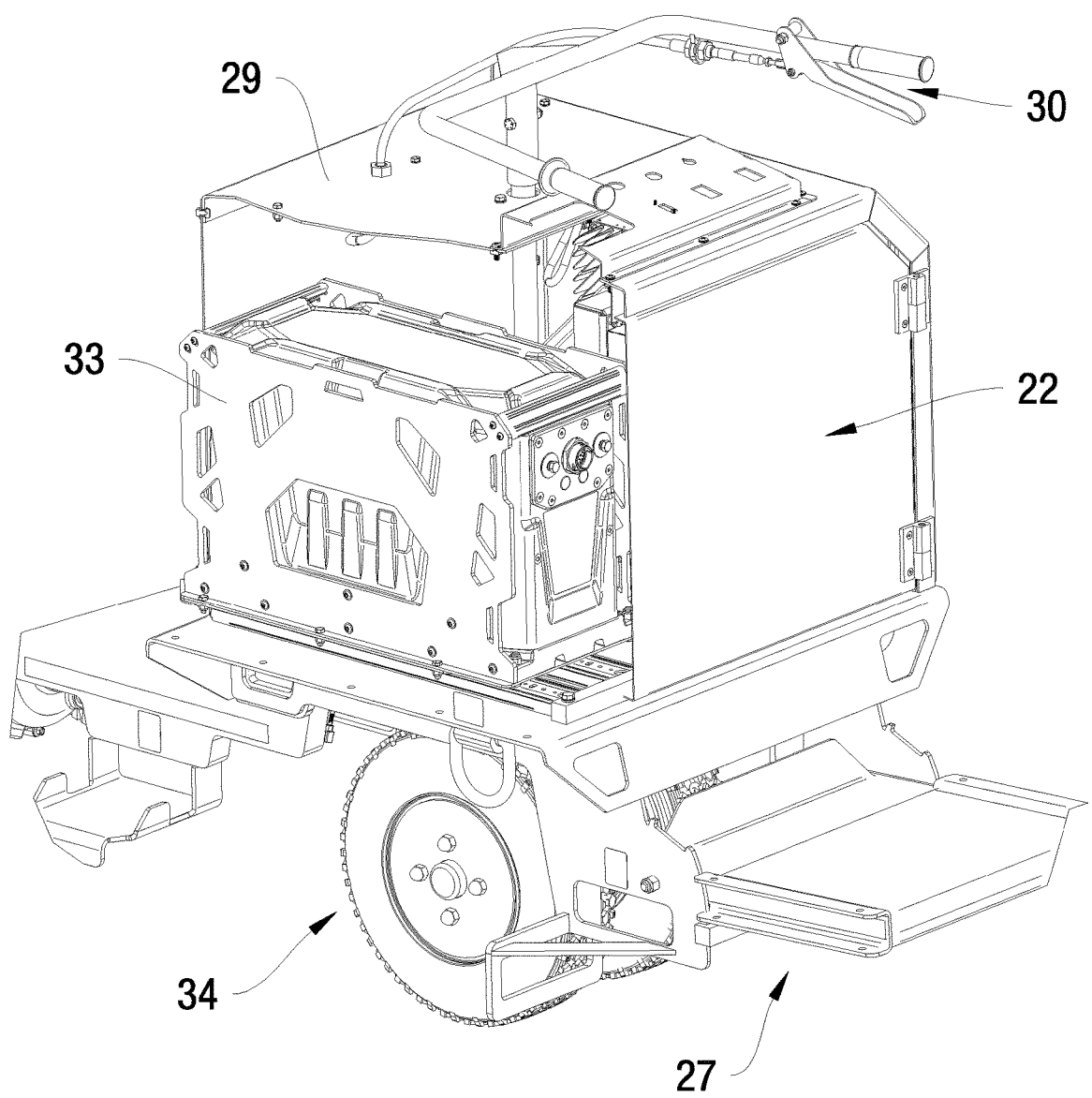
FIG. 6A is a half section isometric view derived from FIG. 6.
Figure 7:
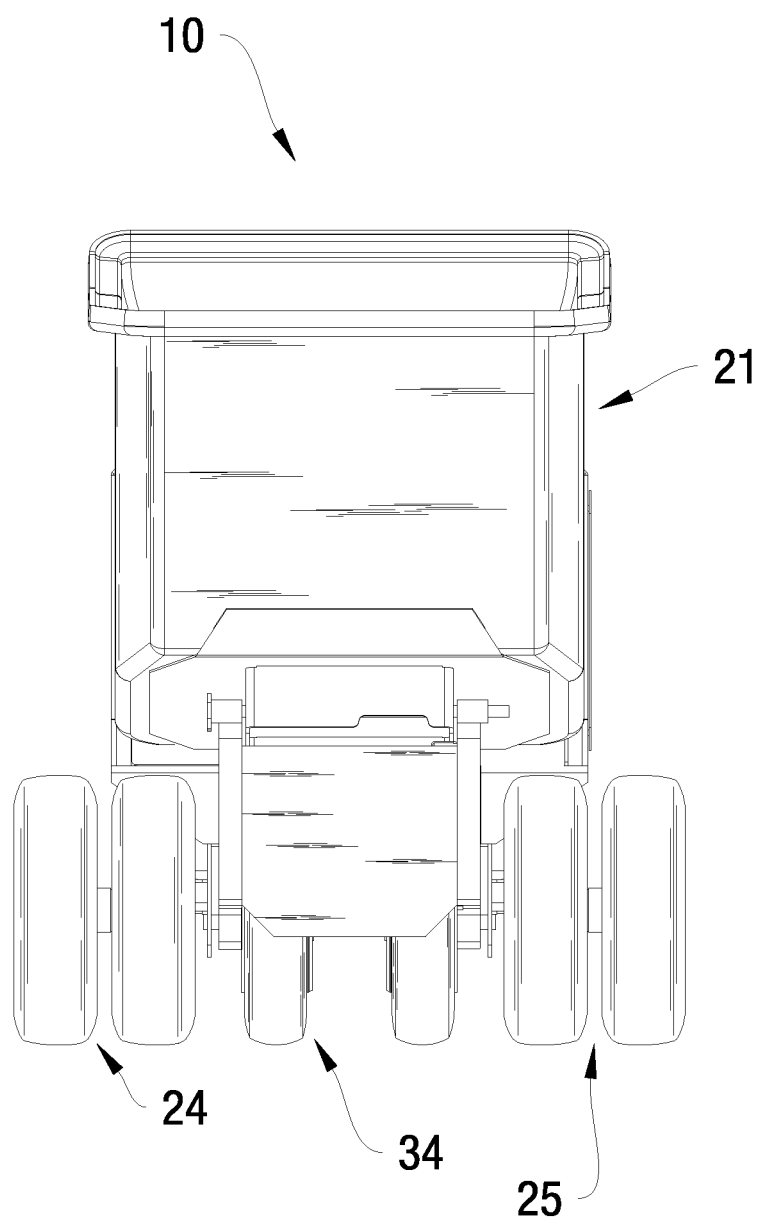
FIG. 7 is a front plan view thereof.
Figure 8:
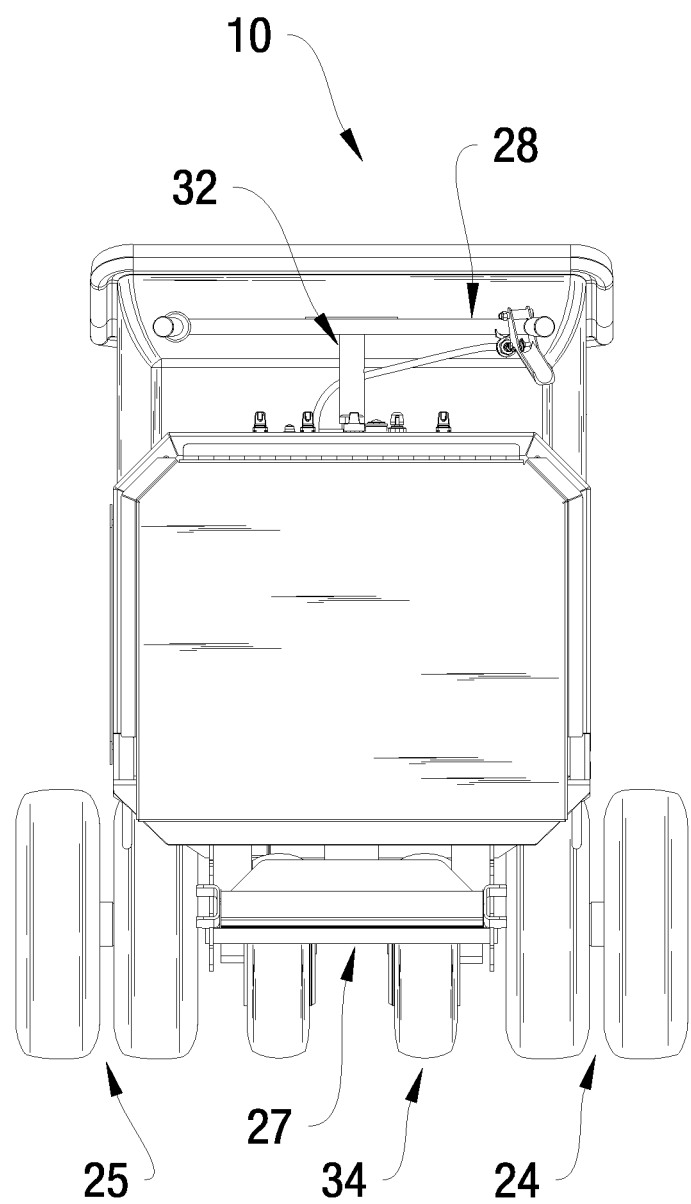
FIG. 8 is a rear plan view thereof.

In operation a human driver or workman (not shown) stands on platform 27 so that the steering inputs are manually effectuated with conveniently accessible handle bars 28. Steering may alternatively be effectuated with operating levers, a steering wheel, or other manually controlled mechanical inputs known in the art. There are a plurality of control switches etc. disposed on the top 29 of the enclosure 22. The steering handle bars 28 mount a hand-operated throttle control 30 that may be manually squeezed to increase vehicle speed. It communicates with a Kraft-brand model 2610-1010 electric throttle control sensor 31 within the cabinetry (FIG. 6A). The handlebars 28 rotate a rigid, elongated steering column 32. Steering is accomplished with steered rear wheels 34. Steering column 32 has a portion that extends downwardly interiorly of enclosure 22 and is linked to the steered rear wheels 34. The steering handlebars 28 rotate the steering column 32, which goes beneath and through cabinetry top 29 (FIG. 9) and a bearing 52, coaxially terminating in a lower steering column shaft extension 54.

Figure 9:
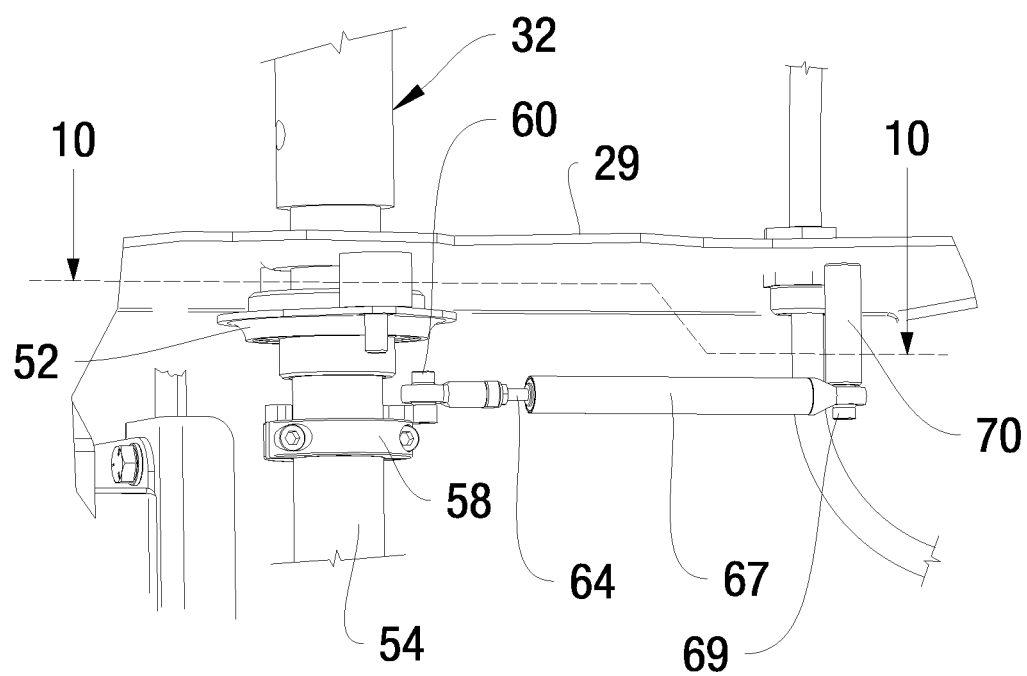
FIG. 9 is an enlarged, fragmentary isometric view of a preferred sensing apparatus, derived generally from line 9-9 in FIG. 1, with portions thereof broken away or shown in section for clarity, or omitted for brevity.
Figure 10:
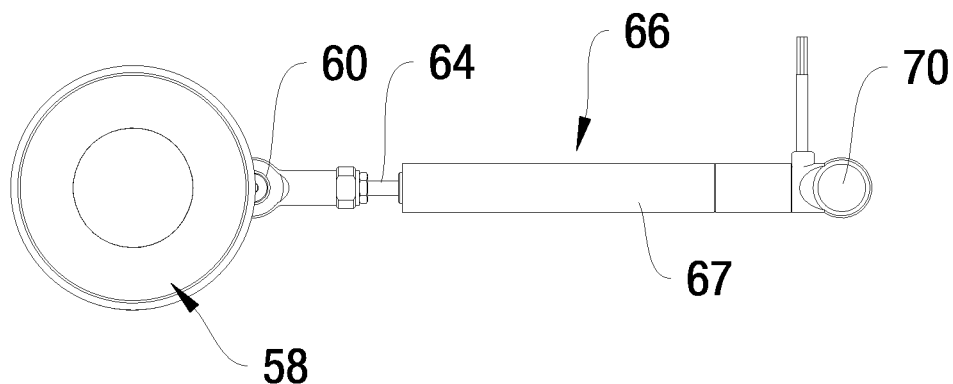
FIG. 10 is an enlarged, fragmentary sectional view taken generally along line 10-10 of FIG. 9.

Alternative means are provided for detecting angular steering displacements in response to the handlebars 28. Signals are derived from steering displacements control the speed of the cart to prevent overspeed. The lower steering column shaft extension 54 rotates in response to mechanical steering inputs (FIGS. 9-11).

In one form of the invention, the steering column portion that extends downwardly interiorly of enclosure 22 comprises an elongated, projecting extension 54 (i.e., FIG. 9) on which a rigid, encircling, control collar 58 is mounted. Collar 58 supports a pivot connection 60 (FIG. 10) on its outer circumference that ultimately controls a linear actuator sensor 66, preferably comprising a Kraft Fluid Systems SLS1322-3-050 sensor. A displaceable plunger 64 emanating from pivot connection 60 coaxially extends from the linear actuator sensor 66. The elongated body portion 67 of the linear actuator sensor 66 is securely, pivotally locked to a rigid, static cylinder 70 that is anchored at its top to cabinetry top 29 (FIG. 3). When steering inputs are made, resultant rotation of the collar 58 radially moves the pivot point 60 in a circular motion. In response to steering turning displacements, the linear actuator 66 varies in length as plunger 64 is forced into or withdrawn from the actuator 67.

Figure 11:
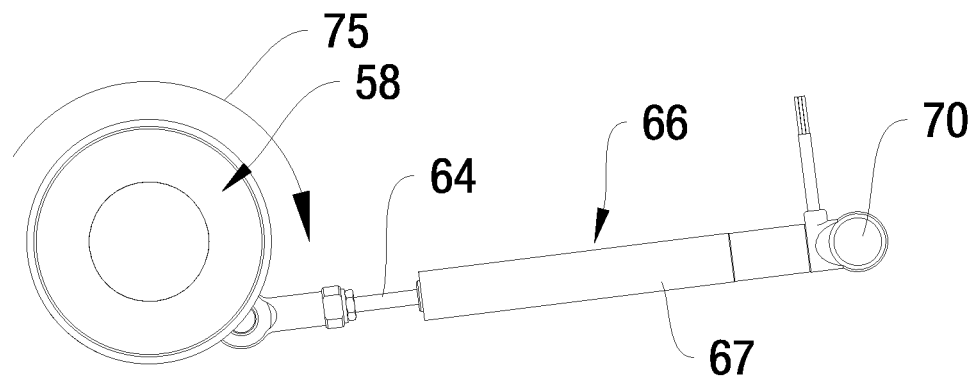
FIG. 11 is a view similar to FIG. 10, but showing steering parts in a displaced position.
Figure 13:
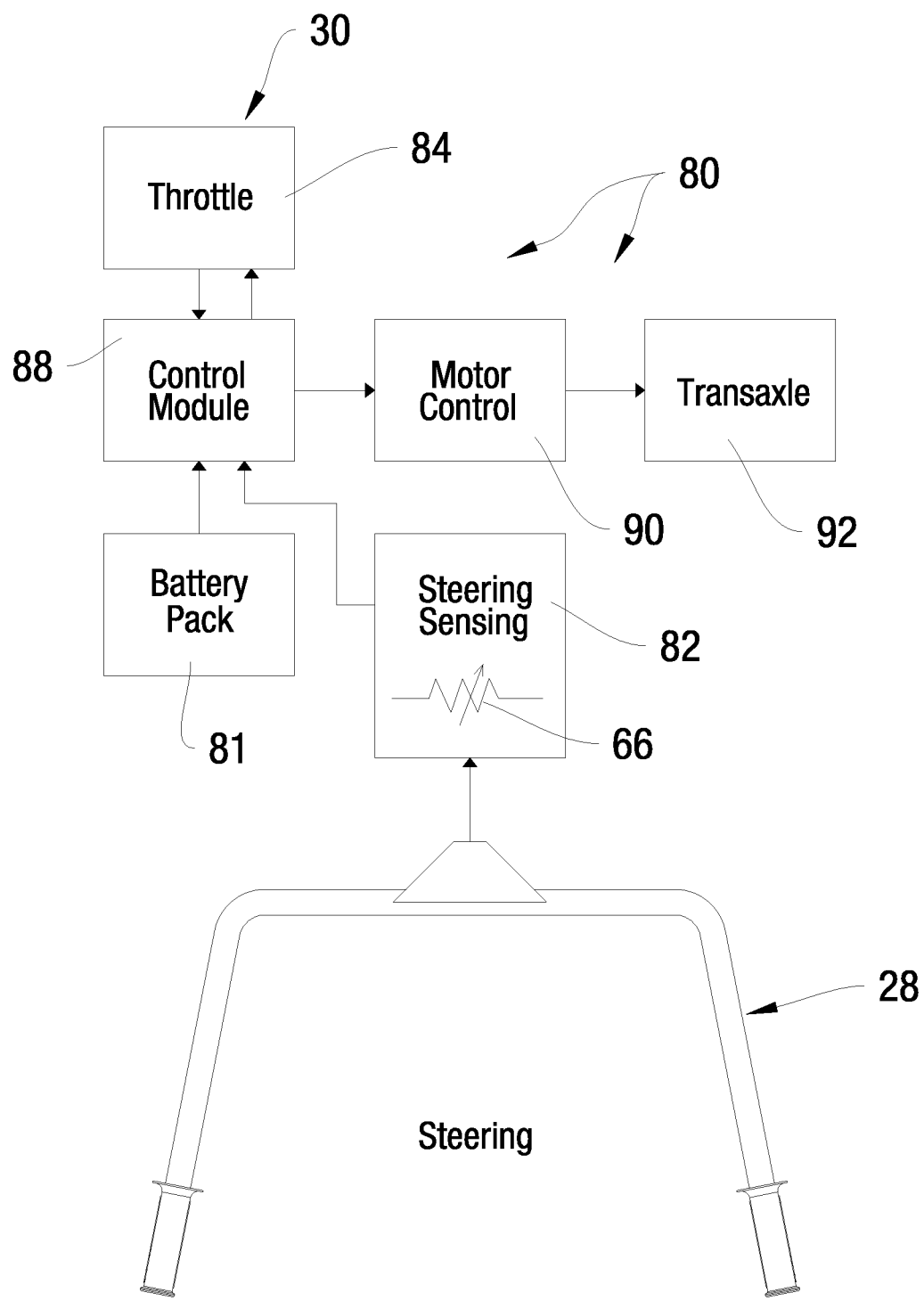
FIG. 13 is a simplified diagrammatic block diagram of the speed control arrangement and control module.

For example, in FIG. 11 it is seen that when collar 58 rotates in the direction of arrow 75, sensor plunger 64 is extended outwardly from body 67, thus generating a proportional, responsive electronic signal handled by the circuitry of FIG. 13. The latter signal corresponds to steering displacements. A potentiometer within sensor 66 varies in resistance depending upon the position of plunger 64 and steering deflection.

The control circuitry in block, diagrammatic form (FIG. 13) has been generally identified by the reference numeral 80. Power is supplied by a rechargeable, nominally forty-eight volt power pack designed schematically by the reference numeral 81. Steering inputs from handlebars 28 are mechanically sensed in step 82 and detected with the linear actuator sensor 66 (i.e., FIG. 9) that comprises an internal potentiometer. The elongated or retracted sensor 66 develops an electrical steering signal in sensing step 82. Displacements to the mechanical throttle control 30 described above are sensed by throttle sensing block 84, that outputs to control module 88. As represented by line 89, steering information from step 82 is also received by the module 88. Suitable comparator software steps executed by module 88 with this data influences motor speed through motor control block 90 and transaxle block 92. The transaxle 100 and a responsive, preferably A/C electric motor 101 are seen in FIG. 12. The transaxle preferably comprises a Schafer Driveline, that includes Schabmueller-brand A/C induction drive motors. It is controlled by the transaxle package 92 supplied with the motor package.

Figure 14:
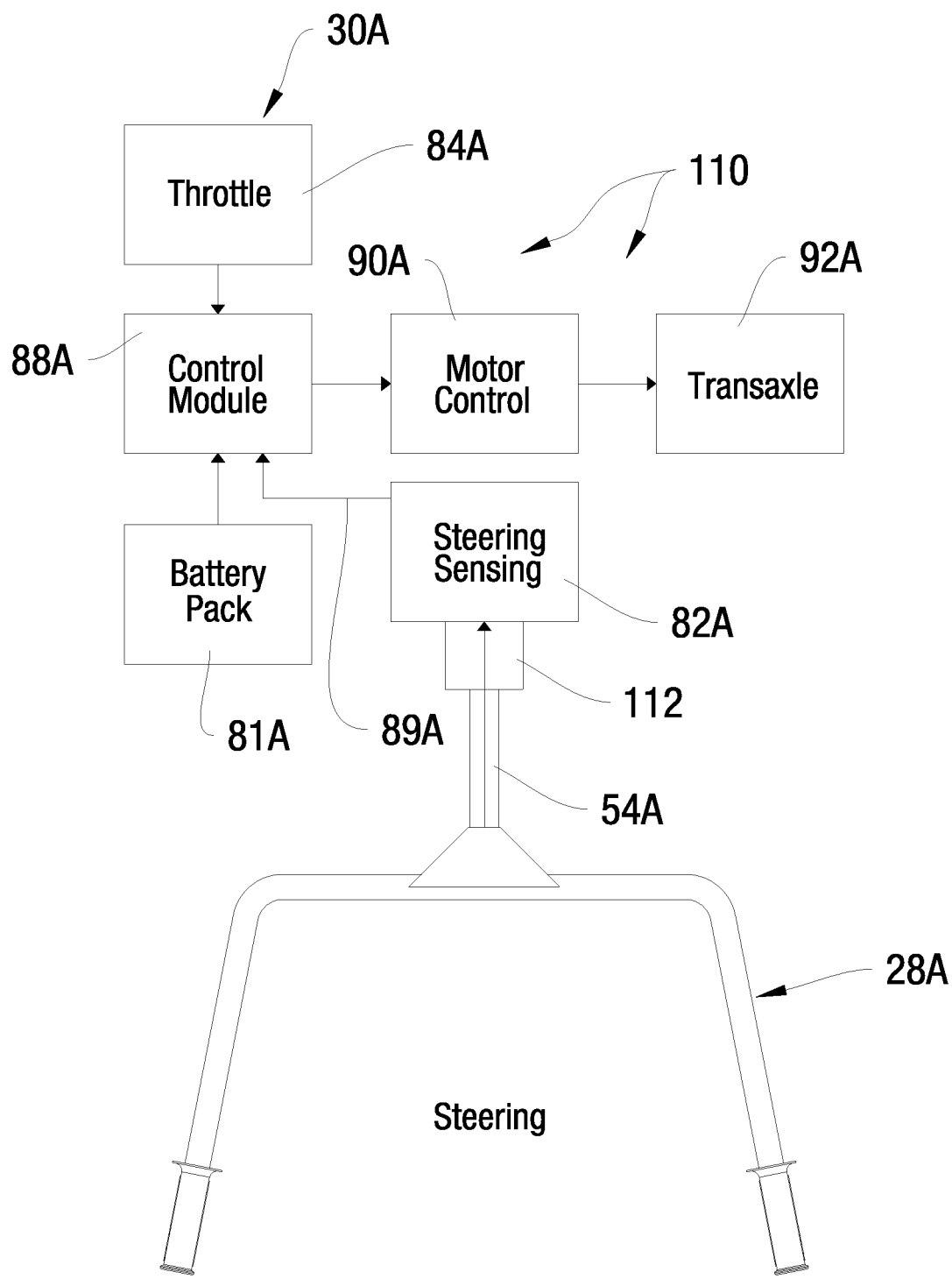
FIG. 14 is a simplified block diagram of the analog speed control arrangement; and, FIG. 15 is a simplified block diagram of a digital speed control arrangement using a displaceable linear sensor.

In FIG. 14 an alternative speed sensing arrangement 110 employing a rotary variable differential transformer 112 turned by the steering shaft 54A. The rotary variable differential transformer 112 measures angular displacement. It acts as an electromechanical transducer that outputs an alternating current voltage proportional to the angular displacement of its rotor in step 82A. The variable A/C output from transformer 112 on line 89A is rectified within alternative control module 88A, and delivers signals to motor control 90A that controls transaxle 92A, notwithstanding the setting of throttle control 84A.

Figure 15:
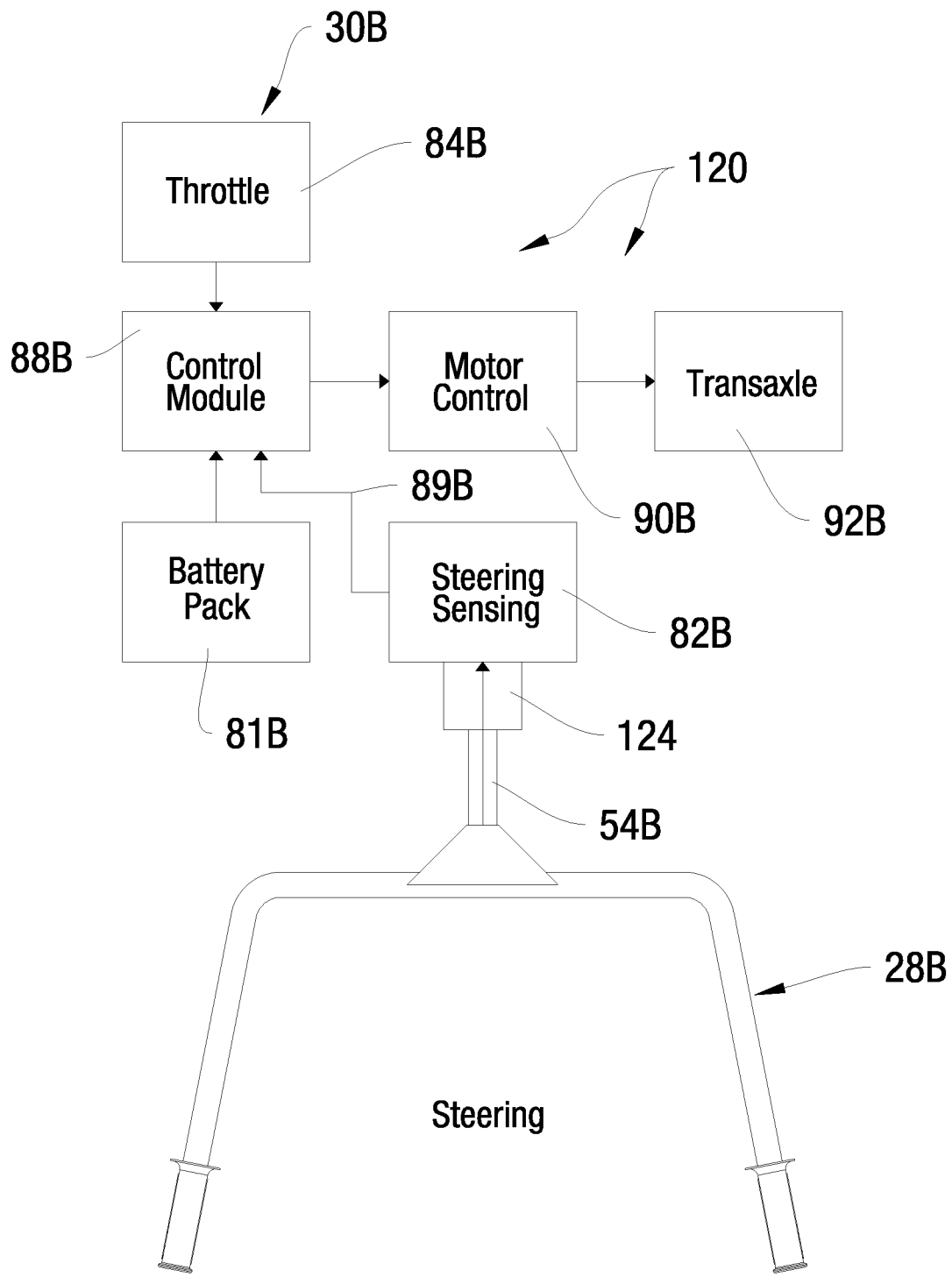

FIG. 15 discloses a second alternative speed sensing arrangement 120. This arrangement uses a rotary encoder, i.e., a shaft encoder, to electro-mechanically derive digital signals from the steering shaft 54B. The preferred rotary encoder is an absolute encoder for indicating true steering shaft position, resulting in accurate angle sensing. Step 82B delivers digital signals via line 89B to control module 88B and motor control 90B that controls transaxle 92B, independently of the setting of throttle control 84A.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. A self-propelled, steerable electric cart comprising:
   wheels supporting the cart, the wheels comprising at least one steered wheel and at least one driven wheel;
   a cargo bucket for hauling and discharging loads;
   at least one electric motor for driving said at least one driven wheel;
   a steering system adapted to be turned by a cart operator for steering said cart, wherein the steering system is mechanically linked to said at least one steered wheel;
   a manual throttle;
   a throttle control module mechanically connected to the throttle;
   a steering system sensor mechanically linked to at least a portion of said steering system for deriving electrical control signals proportional to steering displacement, said control signals delivered to said throttle control module for limiting excessive speed;
   wherein the steering system comprises an elongated steering column portion that rotates when the operator steers the cart;
   a control collar mounted to said steering column portion that rotates therewith, the control collar comprising a pivot connection point that rotates with the collar and steering column portion;
   wherein the steering system sensor comprises a linear actuator with a displaceable plunger controlling a linear potentiometer that generates said electrical control signals in response to axial deflection; and,
   the linear actuator is connected at one end to said pivot connection point and at an opposite end to a fixed point.

2. A self-propelled, steerable electric cart comprising:
   wheels supporting the cart, the wheels comprising at least one steered rear wheel and at least one driven front wheel;
   a cargo bucket for hauling and discharging loads;
   a transaxle for driving said at least one driven wheel;
   a steering system adapted to be turned by a cart operator for steering said cart, wherein the steering system comprises a steering column shaft mechanically linked to said at least one steered rear wheel;
   a manual throttle;
   a throttle control module mechanically connected to the throttle;
   a hand grip for normally controlling said throttle control module; and,
   a steering system sensor associated with said steering system for deriving electrical control signals proportional to steering displacement, said control signals delivered to said throttle control module for limiting excessive speed;
   wherein the steering system comprising the elongated steering column shaft rotates when the operator steers the cart;
   a control collar mounted to said steering column shaft that rotates therewith, the control collar comprising a pivot connection point that rotates with the collar and steering column shaft;
   wherein the steering system sensor comprises a linear actuator with a displaceable plunger controlling a linear potentiometer that generates said electrical control signals in response to axial deflection; and,
   the linear actuator is connected at one end to said pivot connection point and at an opposite end to a fixed point.

\* \* \* \* \*